Oct. 24, 1967  R. K. ALBANO  3,349,249
ALTERNATOR POWER SUPPLY CIRCUIT
Filed July 17, 1964
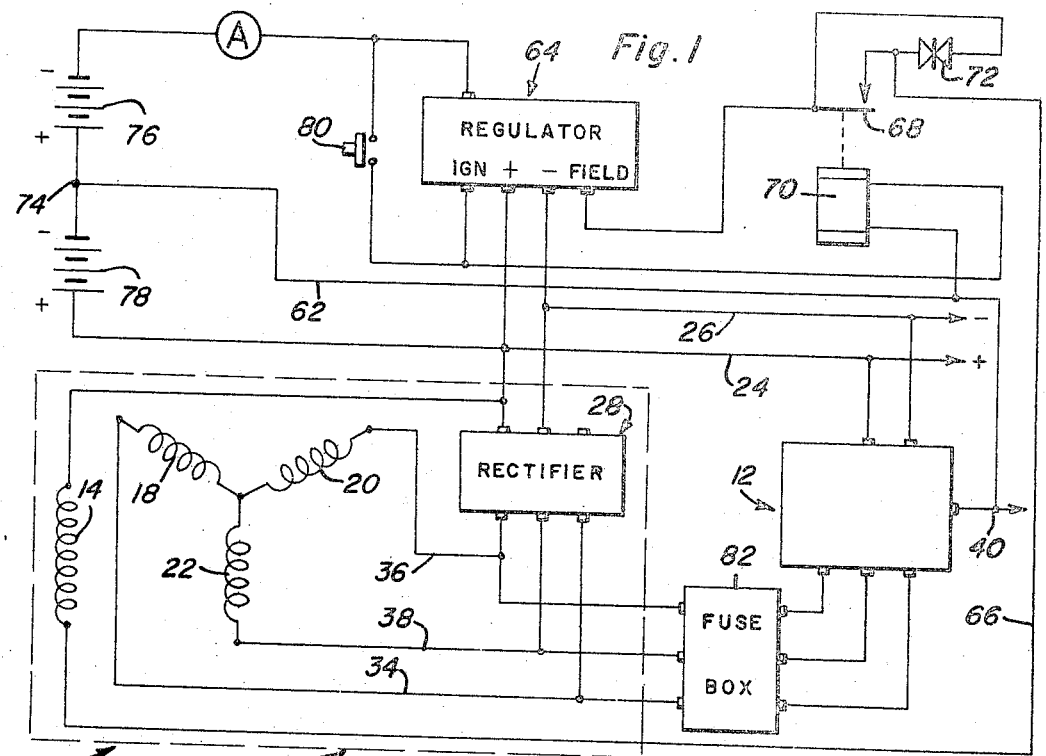
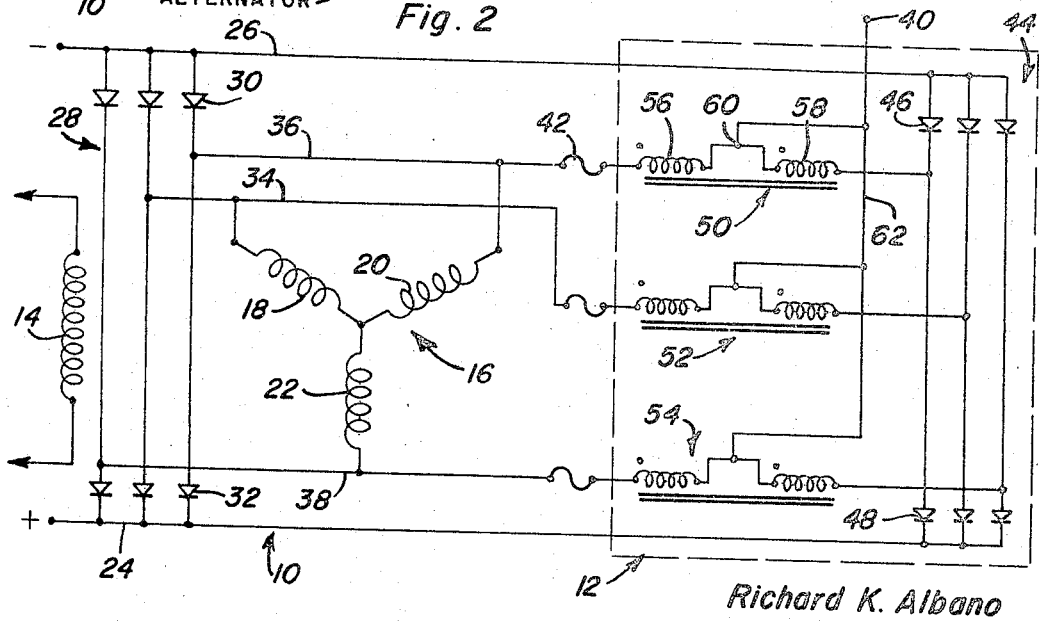
Richard K. Albano
INVENTOR.
BY *[signatures]*
Attorneys United States Patent Office 3,349,249
Patented Oct. 24, 1967

3,349,249
ALTERNATOR POWER SUPPLY CIRCUIT
Richard K. Albano, 429 N. 5th St.,
Pocatello, Idaho 83201
Filed July 17, 1964, Ser. No. 383,300
5 Claims. (Cl. 307—13)

ABSTRACT OF THE DISCLOSURE

A three-wire, single-phase electrical power distributing system for electrical energy originating from an alternator, the three-phase output windings of which are connected through rectifiers to the opposite DC voltage lines of the system. Compensating, reactor devices interconnected between the neutral voltage line and the opposite DC voltage lines, ensures that the volt drops across the lines on either side of the neutral line are balanced despite any combination of unbalanced loads connected to the lines.

This invention relates to an improvement in an AC-DC alternator type of generator power supply.

A primary object of the present invention is to convert an AC to DC alternator into a three wire DC power supply system in which the line voltages remain well balanced even for heavily unbalanced loads.

In accordance with the foregoing object, the present invention may convert conventional AC-DC alternator arrangements by the addition of a load balancing unit connected in combination therewith to several DC loads for example including some connected to a neutral voltage line. The alternator type of power supply arrangement when so modified will be particularly suited for heavy loads often associated with automotive vehicles or electric railways. It will of course be appreciated, that the application of the power supply arrangement of the present invention is not necessarily restricted to such installations.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an electrical circuit diagram showing an installational environment for the arrangement of the present invention.

FIGURE 2 is an electrical circuit diagram showing the combination of the present invention.

Referring now to the drawings in detail, and initially to FIGURE 2, the improvement of the present invention is shown in connection with an alternator type of AC-DC generator generally referred to by reference numeral 10. The alternator is however modified by its connection to the load balancing unit of the present invention generally denoted by reference numeral 12. The alternator is as usual, provided with a rotating field winding 14 supplied with a field exciting current so as to produce a three phase AC output in the stationary armature winding assembly generally referred to by reference numeral 16. The armature winding assembly is therefore composed of Y-connected phase windings 18, 20 and 22 connected to a pair of DC load lines 24 and 26 through a first set of rectifiers 28. The set of rectifiers 28 includes three pair of silicon diodes 30 and 32 poled in the same direction so that each of the phase windings may be interconnected between each pair of diodes by the phase terminal lines 34, 36 and 38. The three phase, AC output of the winding assembly 16 is thereby converted into a DC output in the load lines 24 and 26 of opposite polarity.

By connection of the alternator to the load balancing unit 12 of the present invention, the alternator may be used as a three terminal DC source by terminating the third neutral wire at a stable neutral voltage point 40. Thus, as in any three wire DC power supply, a load may be connected across one of the power lines 24 or 26 and the neutral point 40 to obtain one half of the full power available when the load is connected across the power lines 24 and 26. The unit 12 is interconnected through fuses 42 to the phase terminal lines 34, 36 and 38 and to the power output lines 24 and 26 through a second set of rectifiers 44. The second set of rectifiers therefore also includes three pair of unidirectionally poled diodes 46 and 48 interconnected between the output lines 24 and 26 with a phase inverting device 50, 52 and 54 interconnecting each of the phase terminal lines between one pair of diodes 46 and 48. An alternate current path is thereby established by means of which the line voltages will remain well balanced even for heavily unbalanced loads to which they are connected. Accordingly, any combination of loads some of which are connected to point 40 will not disturb the relationship wherein the volt drop across lines 24 and 40 equals the volt drop across lines 26 and 40.

Each of the phase inverting devices 50, 52 and 54, is similar in construction and electrical relationship between its associated armature phase winding and pair of auxiliary diodes 46 and 48. The phase inverting devices are therefore in the form of autotransformers having a unidirectionally wound coil with an intermediate tap connection 60 to form on one side thereof a primary winding 56 and a secondary winding 58 on the other side. The tap connection 60 forms a common terminal for both primary and secondary windings connected to the neutral voltage line 62. The other terminal of the primary winding 56 is connected through one of the fuses 42 to its associated armature phase winding while the other terminal of the secondary winding 58 is connected between its associated pair of diodes 46 and 48. The primary and secondary windings are therefore so poled with respect to each other that current flows in the same direction from the neutral tap 60 as a result of any transformer action.

At any particular instant during operation of the generator, the phase voltage produced in each of the phase windings of the alternator, will appear as a voltage equal in magnitude and opposite polarity in the secondary windings 58 of the phase inverting reactor devices 50, 52 or 54. Power from each phase winding of the alternator may thereby be supplied to either DC line 24 or 26 depending upon the flow of current along the path of least resistance. For example, if the output voltage of phase winding 18 were positive at a particular instant, and that of the phase winding 20 negative while the voltage produced in phase winding 22 is passing through zero, an unbalancing load on the positive output line 24 would cause an instantaneous drop in the output voltage of the phase winding 18. While current would then be conducted from the phase winding 18 to the positive output line 24, the negative output voltage of phase winding 20 would induce a positive voltage in the secondary winding 58 of its associated phase inverting device 50 so that current may flow through auxiliary diode 48 to the positive line 24. Phase winding 20 is thereby loaded through its autotransformer device 50 and limits its output voltage to that of the positive output line 24. Also, current cannot be conducted from the negative output line 26 to the phase winding 20 until its voltage exceeds that of the negative line. Accordingly, the current flow from neutral or ground follows two paths, one through the secondary winding 58 of its associated transformer device and the other path through the phase windings 18 and 20 and the primary winding 56, both current paths returning to ground or the neutral voltage line from the load. In this manner, balance is restored by increasing the voltage in the positive line 24 in order to allow the voltage in phase winding 20 to become more negative.

Referring now to FIGURE 1, it will be observed that the field winding 14 of the alternator 10 receives its exciting current through the voltage regulator 64 when the power supply circuit is installed in an automotive vehicle for example. The regulator also controls the charging of the vehicle batteries 76 and 78 in a manner well known to those skilled in the art, the details of which form no part of the present invention. Accordingly, the field winding is connected by the line 66 to the relay switch 68 opened by de-energization of the relay coil 70 when the vehicle is parked. The relay switch 68 is bypassed by two selenium rectifiers connected back to back forming a transient voltage suppressing device 72 for the purpose of suppressing the arc at the relay contacts while the alternator field winding 14 is discharging its stored energy. The relay coil 70 is therefore connected to the neutral voltage line 62 connected to the common terminal 74 of the vehicle batteries 76 and 78. The relay coil is also connected to the output terminal of battery 76 upon closing of the parking switch 80. Also, the output of the power supply arrangement is connected to the proper terminals of the voltage regulator 64 by the output lines 24 and 26 while the phase terminal lines connected to the first set of rectifiers 28 are also connected through the fuses 42 in the fuse box 82 to the load balancing unit 12. A vehicle battery charging installation is therefore shown in FIGURE 1 wherein the series connected batteries 76 and 78 constitute loads respectively connected across lines 26 and 62 through regulator 64 and lines 24 and 62 to which charging voltage may be applied from the alternator 10 through balancing unit 12 which ensures that the voltage applied on each side of the neutral line is balanced as aforementioned.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with an alternator having a plurality of phase windings interconnected through rectifiers with DC loads having a neutral voltage line, a voltage balancing unit connected to said phase windings and the neutral line comprising, phase inverting means connected to each of said phase windings and the neutral line and rectifier means interconnecting said phase inverting means to the DC loads for supply of current through both the rectifiers associated with the alternator and the rectifier means.

2. In combination with a plural phase AC generator having interconnected phase windings, each phase winding being connected to a common pair of DC load lines through a pair of power output rectifiers, a load balancing unit for establishing alternate current paths from each phase winding to said load lines comprising, a phase inverting transformer connected to each phase winding, a pair of auxiliary rectifiers connecting each of said transformers to the load lines, each of said transformers including a primary winding and a secondary winding having a common terminal connected to a neutral voltage line, said secondary winding having a polarity relative to the primary winding for conducting current through both windings in the same direction from the common terminal, the primary winding being connected to one of said phase windings of the generator and the secondary winding being connected to a pair of said auxiliary rectifiers.

3. In a generator having a rotating field winding and a stationary three phase, Y-connected armature winding assembly, a pair of DC output terminals of opposite polarity, a neutral voltage terminal, a first set of rectifiers connecting said armature winding assembly to the output terminals for unidirectional supply of current thereto, a plurality of phase inverting devices connected to said armature winding assembly and the neutral voltage line, and a second set of rectifiers connecting the phase inverting devices to the output terminals, whereby the line voltages on opposite sides of the neutral voltage terminal are balanced.

4. The combination of claim 3 wherein said armature winding assembly comprises interconnected phase windings connected in parallel to the first set of rectifiers and the phase inverting devices, each phase inverting device comprising an autotransformer having a primary coil connected between one of the phase windings and the neutral voltage terminal, a secondary coil connected between the second set of rectifiers and the neutral voltage terminal, said primary and secondary coils being formed by a unidirectionally wound winding having a tap connection to the neutral voltage line to conduct current in the same direction from the neutral voltage line.

5. The combination of claim 1 wherein said DC loads comprise series connected batteries having a common terminal connected to said neutral line and output power terminals of opposite polarity, and charging circuit means connecting said terminals to the rectifiers associated with the phase windings of the alternator.

References Cited

UNITED STATES PATENTS

| | | | |
|---|---|---|---|
| 2,729,750 | 1/1956 | Draper et al. | 320—15 X |
| 2,866,907 | 12/1958 | Gebhard | 320—15 X |
| 2,913,587 | 11/1959 | Gebhard | 320—16 X |
| 3,247,441 | 4/1966 | Kimbleton | 320—12 |
| 3,247,442 | 4/1966 | Medlar | 320—29 |

ORIS L. RADER, *Primary Examiner.*

T. B. JOIKE, *Assistant Examiner.*